United States Patent [19]

Saito et al.

[11] Patent Number: 4,933,758
[45] Date of Patent: Jun. 12, 1990

[54] SIGNAL PROCESSING APPARATUS WITH A MOVEMENT DETECTING DEVICE AND AN OUTLINE ENHANCEMENT DEVICE

[75] Inventors: Katsuyuki Saito; Masao Uehara; Masahide Kanno; Masahiko Sasaki; Akinobu Uchikubo, all of Hachioji, Japan

[73] Assignee: Olympus Optical Co., Ltd., Tokyo, Japan

[21] Appl. No.: 385,594

[22] Filed: Jul. 24, 1989

[30] Foreign Application Priority Data

Oct. 27, 1988 [JP] Japan .................................. 63-272831

[51] Int. Cl.[5] .......................... H04N 7/18; A61B 1/04
[52] U.S. Cl. ...................................... 358/98; 358/96; 358/105; 358/166
[58] Field of Search .................. 358/98, 105, 96, 166, 358/125; 128/4-6

[56] References Cited

U.S. PATENT DOCUMENTS

| | | | |
|---|---|---|---|
| 4,663,657 | 5/1987 | Nagaski et al. | 358/98 |
| 4,719,508 | 1/1988 | Sasaki et al. | 358/98 |
| 4,783,833 | 11/1988 | Kawabata et al. | 358/105 X |
| 4,805,018 | 2/1989 | Nishimura et al. | 358/96 X |

FOREIGN PATENT DOCUMENTS 60-106288 6/1985 Japan .

Primary Examiner—Edward L. Coles, Sr.
Assistant Examiner—Victor R. Kostak
Attorney, Agent, or Firm—Armstrong, Nikaido, Marmelstein, Kubovcik & Murray

[57] ABSTRACT

The signal processing apparatus of the present invention comprises a video signal producing circuit for producing a standard video signal by processing an image signal representing an image of an object, a movement detecting circuit for detecting the movement quantity of the object from the video signal and an outline enhancing circuit provided after the movement detecting circuit for enhancing the outline of the image.

18 Claims, 20 Drawing Sheets

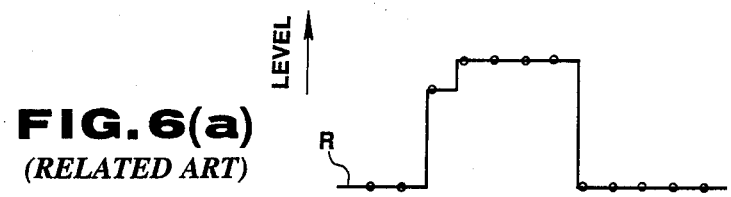
FIG. 6(a) *(RELATED ART)*
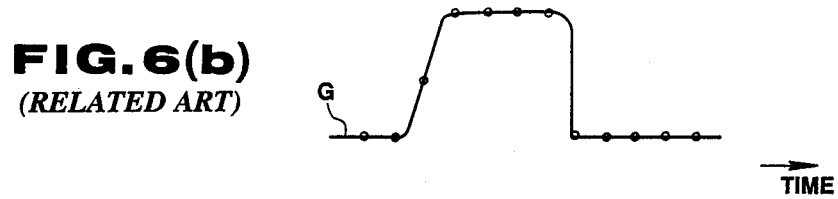
FIG. 6(b) *(RELATED ART)*
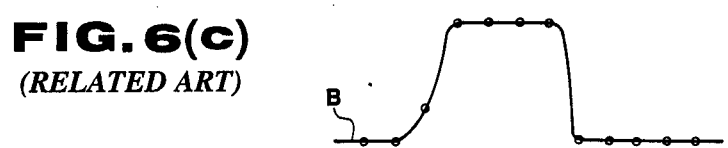
FIG. 6(c) *(RELATED ART)*
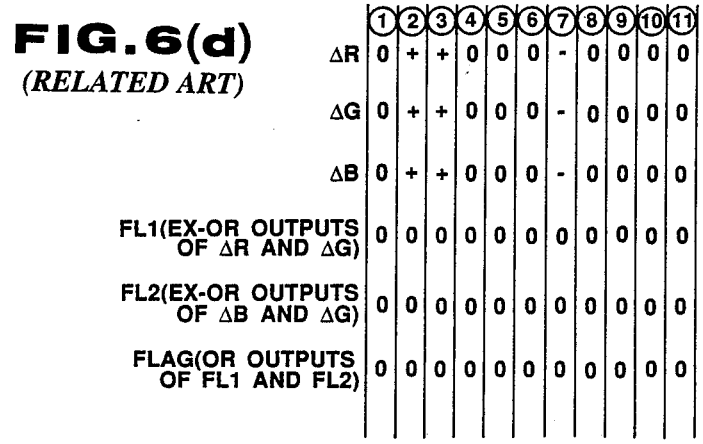
FIG. 6(d) *(RELATED ART)*

FIG. 7(a) *(RELATED ART)*
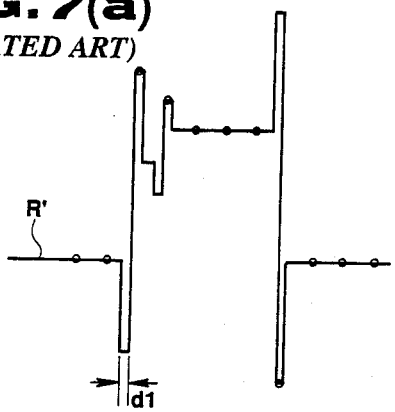
FIG. 8(a) *(RELATED ART)*
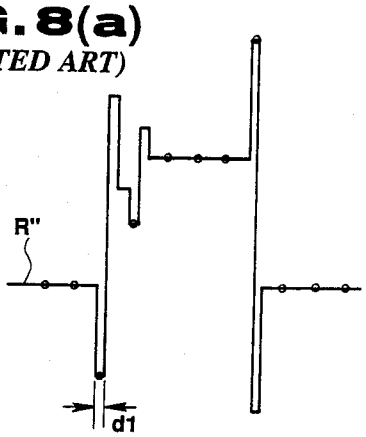
FIG. 7(b) *(RELATED ART)*
FIG. 7(c) *(RELATED ART)*
FIG. 7(d) *(RELATED ART)*
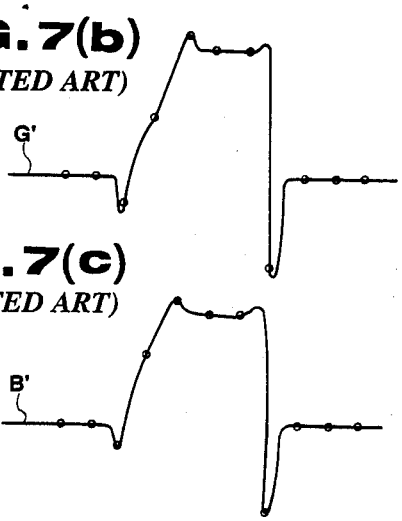
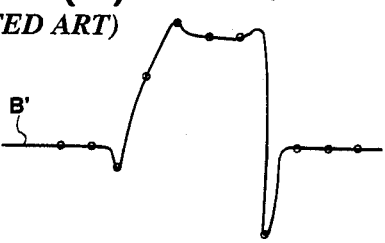
FIG. 8(b) *(RELATED ART)*
FIG. 8(c) *(RELATED ART)*
FIG. 8(d) *(RELATED ART)*
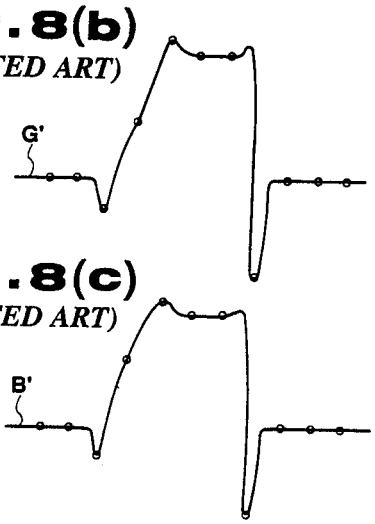
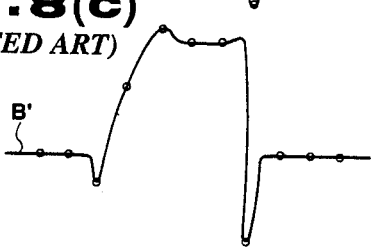

FIG. 10
*(RELATED ART)*
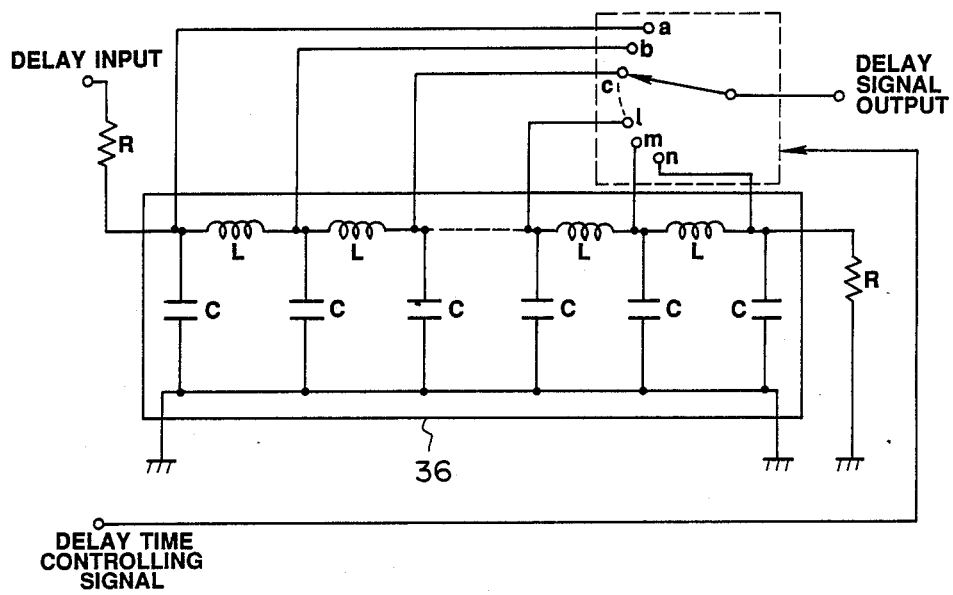
FIG. 14(a)
*(RELATED ART)*
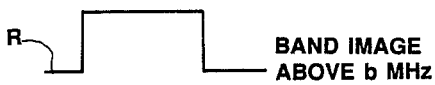
FIG. 14(b)
*(RELATED ART)*
FIG. 14(c)
*(RELATED ART)*
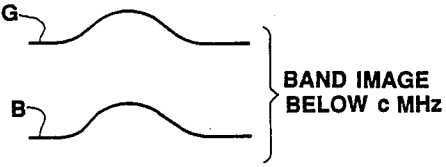

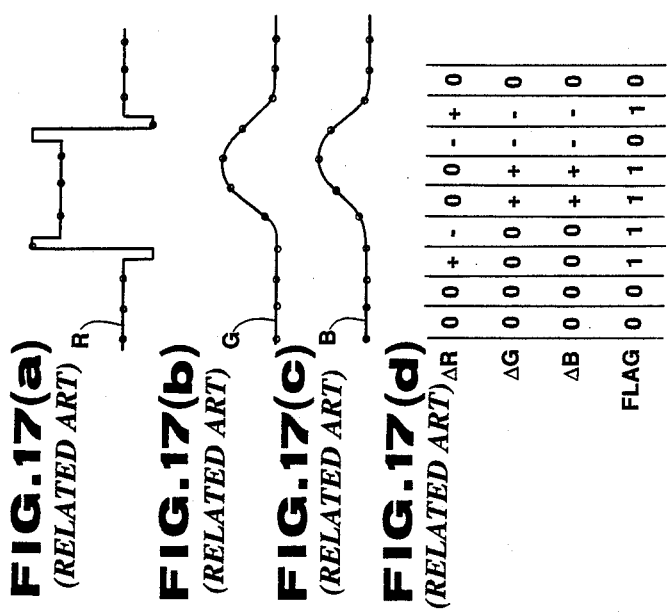
FIG.17(a) (RELATED ART)
FIG.17(b) (RELATED ART)
FIG.17(c) (RELATED ART)
FIG.17(d) (RELATED ART)
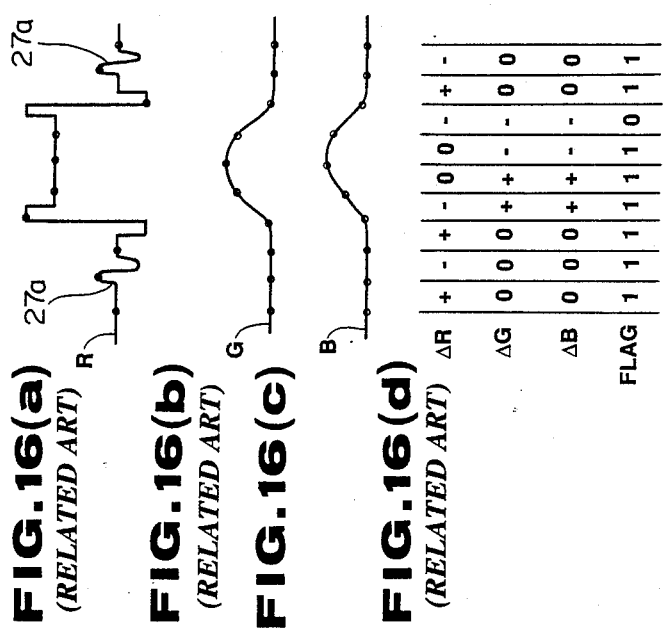
FIG.16(a) (RELATED ART)
FIG.16(b) (RELATED ART)
FIG.16(c) (RELATED ART)
FIG.16(d) (RELATED ART)

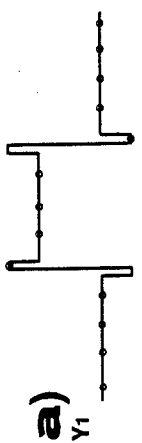
FIG.23(a) Y1
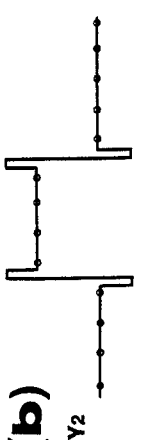
FIG.23(b) Y2
FIG.23(c)
| ΔY1 | 0 | 0 | 0 | 0 | - | 0 | 0 | - | 0 | 0 | + | 0 | 0 | 0 |
|---|---|---|---|---|---|---|---|---|---|---|---|---|---|---|
| ΔY2 | + | - | 0 | + | - | - | + | - | - | + | + | - | 0 |
| FLAG | 1 | 1 | 0 | 0 | 0 | 1 | 1 | 0 | 0 | 1 | 1 | 0 |
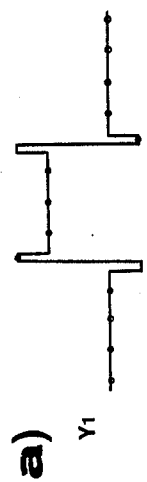
FIG.24(a) Y1
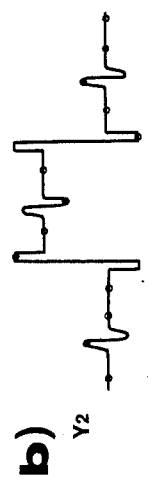
FIG.24(b) Y2
FIG.24(c)
| ΔY1 | 0 | 0 | 0 | 0 | + | 0 | 0 | 0 | - | 0 | 0 | 0 | 0 | 0 |
| ΔY2 | 0 | 0 | 0 | + | 0 | 0 | - | 0 | 0 | 0 | 0 | 0 |
| FLAG | 0 | 0 | 0 | 0 | 1 | 0 | 0 | 0 | 1 | 0 | 0 | 0 |

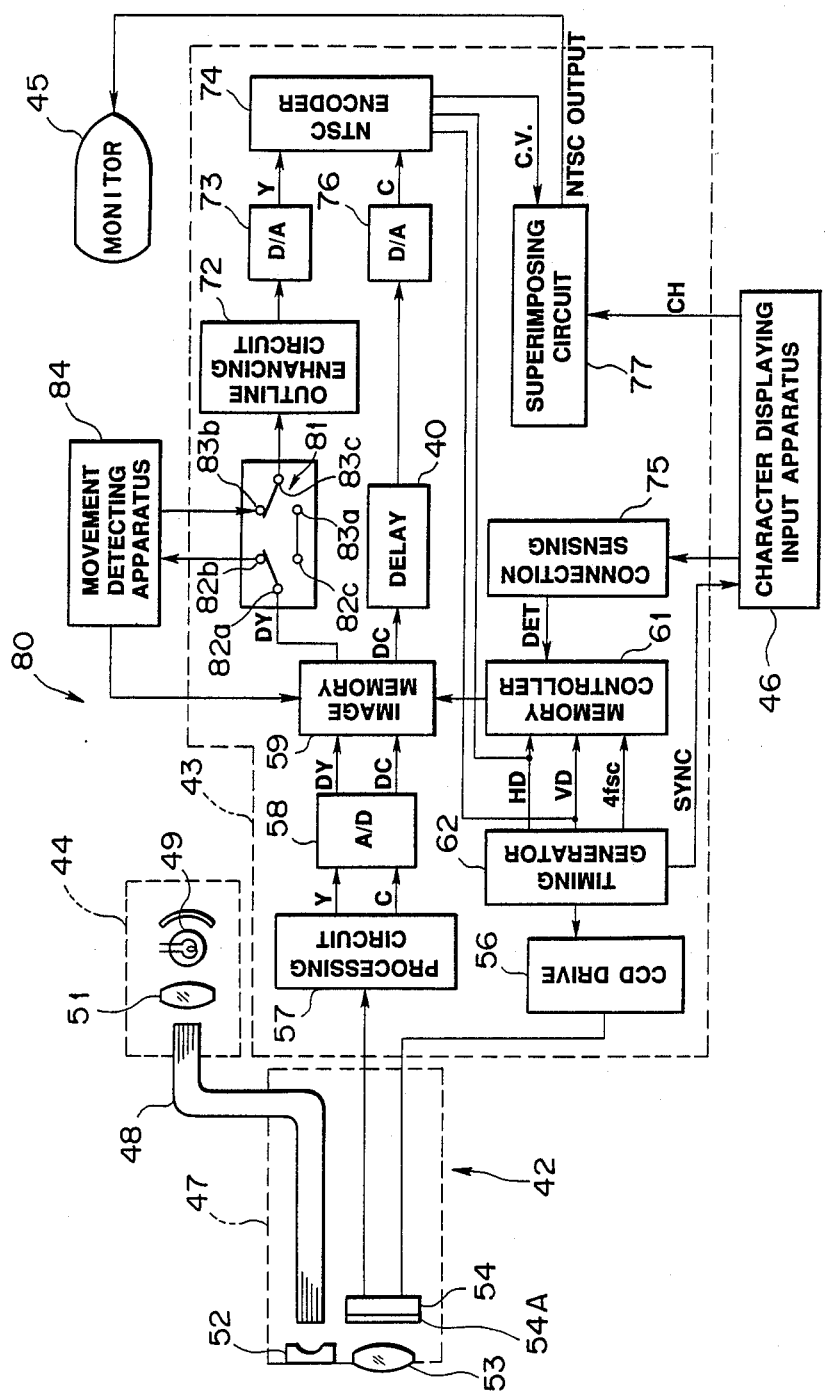

4,933,758

SIGNAL PROCESSING APPARATUS WITH A MOVEMENT DETECTING DEVICE AND AN OUTLINE ENHANCEMENT DEVICE

UTILIZATION FIELD AND BACKGROUND OF THE INVENTION

This invention relates to a signal processing apparatus having a movement detecting means and an outline enhancing means.

Recently, with the progress in the technique of producing solid state imaging devices, images are high in density, chips are very small and an endoscope fitted with a solid state imaging device in the tip part or a so-called electronic endoscope apparatus is developed. Such an apparatus has a function of observing an inspected part and recording the observed image of the part when the apparatus is inserted into a body cavity. Not only the inspecting activity but also the quality of the recorded image is so important as to greatly influence the diagnosis of the inspected part. Therefore, in recording, the endoscope operator has stilled the patient, has frozen and displayed the image of the inspected part several times, has selected the most desirable image as a recorded image and has recorded the still picture, for example, in a monitor image photographing apparatus, video printer or still video floppy apparatus.

However, even if the patient is stilled, so long as the living body interior is observed, the inspected part will move a little and, in order to eliminate the movement of the image due to this movement, the image will have to be re-frozen several times in some case.

In order to cope with this problem, a movement detecting circuit shown in FIG. 1 is devised. Embodiments of an endoscope using this movement detecting circuit are shown in FIGS. 2 and 3. FIG. 2 is of an endoscope apparatus removably connected with a movement detecting apparatus as a peripheral instrument. FIG. 3 is of an endoscope apparatus having a detecting circuit built-in. In FIG. 2, an endoscope apparatus 1 comprises an electronic endoscope 2 to be inserted into a body cavity, a controlling apparatus 5 having a signal processing part, a light source apparatus 3 feeding an illuminating light to the above mentioned electronic endoscope 2, a monitor 4 displaying an object image and a movement detecting apparatus 6. The above mentioned electronic endoscope 2 has an insertable part 7 to be inserted into a body cavity. An objective lens system 9 and an emitting end surface of a light guide 11 emitting the illuminating light are provided on the tip surface of this insertable part 7. The light guide 11 is inserted through the insertable part 7 and is connected to the above mentioned light source apparatus 3. The illuminating light emitted by a light source lamp 12, transmitted through a rotary filter 15 rotated by a motor 13 and condensed by a condenser lens 14 enters the connected light guide 11 on the entrance end surface. This illuminating light is radiated to an object 10 from the exit end surface of the light guide 11. The illuminated object 10 forms an image on the imaging surface of a solid state imaging device 8 by the above mentioned objective lens system 9. This formed image is photoelectrically converted, is read out by a CCD driver 29 and is delivered as an electric signal to the controlling apparatus 5. This electric signal is written into an R memory 19R, G memory 19G and B memory 19B by a multiplexer 18 through a tone correcting circuit 16 and A/D converter 17. The written video data are read out and are outline enhanced in an R outline enhancing circuit 21R, G outline enhancing circuit 21G and B outline enhancing circuit 21B and are delivered to the above mentioned movement detecting apparatus 6 through D/A converters 20a, 20b and 20c.

In FIG. 4, the video data from the respective memories 19 are delayed by a delaying device d1 and are input into an adder A1. The output of this delaying device d1 is further input into a delaying device d2 and is input into adders A2 and A3. The output of the delaying device d2 is added in the adder A1 and the output of this adder A1 is multiplied by $-\frac{1}{2}$ in a counter C1, is input into the above mentioned adder A2 and is made an outline enhancing component. This outline enhancing component is multiplied by $\alpha$ in the counter C2 and has a signal level set. The output of this counter C2 is added to the output of the above mentioned delaying device d1 in the above mentioned adder A3 to obtain video data which is outline enhanced.

In the above mentioned movement detecting apparatus 6, when a freezing signal is input from a switch (not illustrated) or the like, the image of the least movement of the input images will be detected, a freezing signal will be output to the respective memories 19 (representing 19R, 19G and 19B) at the timing at which this image has been detected and it will be inhibited to write the video data into the memories 19. The memories 19 repeatedly read out the video data to display the still image of the least movement in the monitor 4.

In FIG. 3, the same as in FIG. 2, video data is input into a movement detecting circuit 22 from the respective outline enhancing circuits 21 (representing 21R, 21G and 21B) and the image of the least movement is detected. The video data having had the movement quantities detected are converted to a composite video signal, for example, of an NTSC system by an encoder 30 through the D/A converters 20 (representing 20a, 20b and 20c).

Here, it is assumed that, in FIG. 2, in case the outline enhancing circuit 21 is off, the video signals R, G and B at the output terminal 23 of the controlling apparatus 5 shall be such signals as are shown in FIGS. 5(a), 5(b), 5(c) (wherein the R signal frequency component shall be higher than the G and B signal frequency components and no color movement of R, G and B shall be produced).

In case the movement is detected on these signals R, G and B, the signals will be sampled in each predetermined sampling period by coding means 24a, 24b and 24c forming the movement detecting circuit 22 shown in FIG. 1, the correlation will be detected by a comparing means 26 and further the movement quantity will be detected by a quantifying means 25. A visible model of the correlation detection is shown in FIG. 6.

In FIG. 6, the signals R, G and B shown respectively in (a), (b) and (c) are sampled for the periods of the mark ○ by the coding means 24a, 24b and 24c and the variations $\Delta R$, $\Delta G$ and $\Delta B$ of level in this sampling period are shown by signs (+, − and 0) as in (d) in FIG. 6. For these signs, exclusive logical sums (exclusive OR) FL1 and FL2 are taken in a comparing means 68 and further a logical sum (OR) FLAG of FL1 and FL2 is taken. In FIG. 6, FLAG does not stand at all and no color movement is detected to be produced.

On the other hand, in case the outline enhancing circuit 21 is on for the above mentioned object, such correlation detection as is shown in the visible model in FIG. 7 will be made the same as is mentioned above on the video signals R', G' and B' output from the output terminal 23 and enhanced in the outline. In FIG. 7, though the signals shown in FIG. 5 the same as in the case that the outline enhancing circuit 21 is off are input, four FLAG's stand and the color movement quantity is detected to be large.

Next, in FIG. 8, in a visible model shown for the images in which there is a color movement by a time $\tau$ in only the R image, three FLAG's stand. Though there is a color movement as compared with the number of FLAG's in FIG. 7, the sensed color movement quantity is small and the color movement sensing precision is low.

The circuit in case the enhancing fequency is switched in the outline enhancing circuit 21 in FIG. 4 is shown in FIG. 9. In an outline enhancing frequency switching circuit 28 in FIG. 9, the enhancing frequency can be varied by switching such tap of DL36 as is shown in FIG. 10 by a controlling signal from an external enhancing frequency band setting input. The images of R, G and B in case the enhancing frequencies which are switched are a $MH_z$ and b $MH_z$ are shown in FIGS. 12 and 13, (the output images of the endoscope apparatus are shown in FIG. 14) and the visible models for the respective images show that, in the case of a $MH_2$ (FIG. 12), five FLAG's will stand and, in the case of b $MH_z$ (FIG. 13), the FLAG's will be three and the sensed color movement quantity will be smaller than in a $MH_z$. Therefore, when the enhancing frequency is varied, the color movement sensing precision will vary to be a great trouble.

Also, in case the endoscope appartus 1 is provided with such tone correcting circuit 27 as is shown in FIG. 15 so that the levels of the signals R and B for the signal G may be variable with the intention of the user, if there is a random noise 27a uniformly, for example, in the images R, G and B, the level of the signal R will be elevated by the tone correcting circuit 27. As the outline of this image is enhanced, the output will be as shown in FIG. 16. In such a case, the number of FLAG's will be 8 and therefor color movement as is shown in FIG. 17 will be produced but, for the image having no random noise, the number of FLAG's will be 5, the sensed color movement quantity will be reduced and the color movement sensing precision will vary.

The tone correcting circuit 27 in FIG. 15 switches on and off the respective switches within SW1 and SW2 by the controlling information from the external tone setting switch, selects the respective resistances R of the base earthing circuit and varies the respective gains of R and B for G to correct the tone.

In case the movement detecting circuit 22 (or the movement detecting apparatus 6) is provided in the step after the outline enhancing circuit, the precision of sensing the color movement and image movement will reduce and the image having a color movement or image movement will be likely to be mis-sensed to be an image having no color movement or image movement.

OBJECT AND SUMMARY OF THE INVENTION

An object of the present invention is to provide a signal processing apparatus having a high precision of sensing a color movement or image movement irrespective of the enhancing frequency and enhanced quantity.

The signal processing apparatus of the present invention is provided with an outline enhancing circuit after a movement detecting circuit, detecting the movement of an object to be imaged, so that a video signal is input into the movement detecting circuit, has the movement quantity detected and is then input into the outline enhancing circuit to have the outline enhanced.

BRIEF DESCRIPTION OF THE DRAWINGS

FIGS. 1 to 17 relate to related arts.

FIG. 1 is an explanatory diagram of the formation of a movement detecting circuit.

FIG. 2 is a formation explaining diagram of an endoscope apparatus connected with a movement detecting apparatus.

FIG. 3 is a formation explanining diagram of an endoscope apparatus having a movement detecting circuit built-in.

FIG. 4 is a formation explaining diagram of an outline enhancing circuit.

FIGS. 6a–6b show operations explaining diagrams of a comparing means.

FIGS. 7a–7d show operations explaining diagrams of a comparing means when there is no color movement.

FIGS. 8a–8d show operations explaining diagrams of a comparing means when there is a color movement in only R.

FIG. 9 is a formation explaining diagram of an outline enhancing circuit having an enhancing frequency switching circuit.

FIG. 10 is an explanatory diagram of the formation of the switching circuit in FIG. 9.

FIG. 11 is an explanatory diagram of enhancing frequencies.

FIGS. 14a–14c show waveform diagrams of signals R, G and B in FIG. 9.

FIG. 15 is an explanatory diagram in the case of having a tone correcting circuit.

FIGS. 16a–16d show operations explaining diagrams of a comparing means having no color movement.

FIGS. 17a–17d show operation explaining diagrams a comparing memans having a color movement.

FIGS. 18 and 19 relate to the first embodiment of the present invention.

FIG. 18 is an explanatory diagram of the formation of an endoscope apparatus.

FIGS. 20 to 24 relate to the second embodiment of the present invention.

FIG. 20 is an explanatory diagram of the formation of an endoscope apparatus.

FIG. 21 is an explanatory diagram of the formation of a movement detecting circuit.

FIG. 22 is an explanatory diagram of the formation of an endoscope apparatus provided with a movement detecting circuit in the step after the outline enhancing circuit.

FIGS. 23a–23c show operations explaining diagrams of a comparing means having no image movement.

FIGS. 24a-24c show operations explaining diagrams of a comparing means having an image movement.

FIG. 25 relates to the third embodiment of the present invention and is an explanatory diagram of the formation of an endoscope apparatus.

DETAILED DESCRIPTION OF THE PREFERRED EMBODIMENTS OF THE INVENTION

Figure 18:
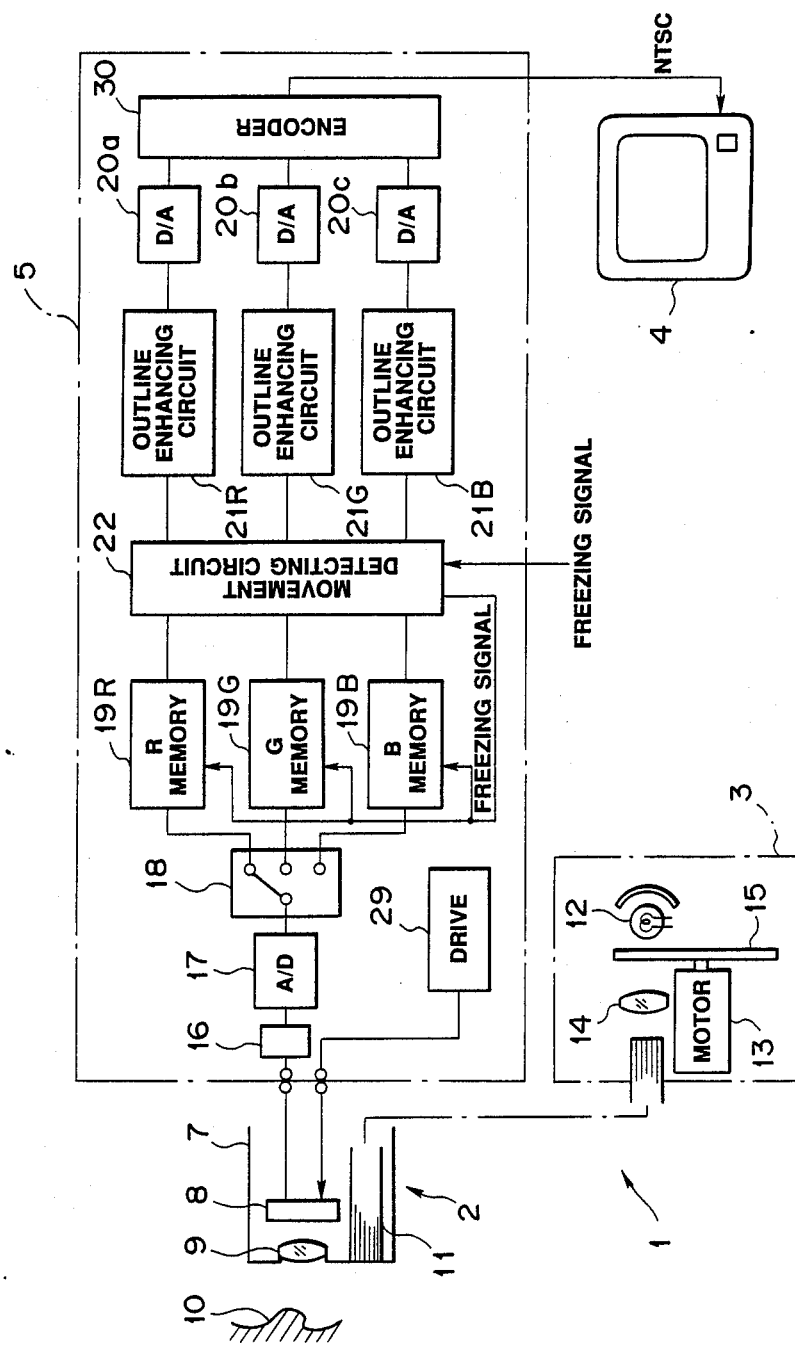

FIGS. 18 and 19 show the first embodiment of the present invention.

Figure 2:
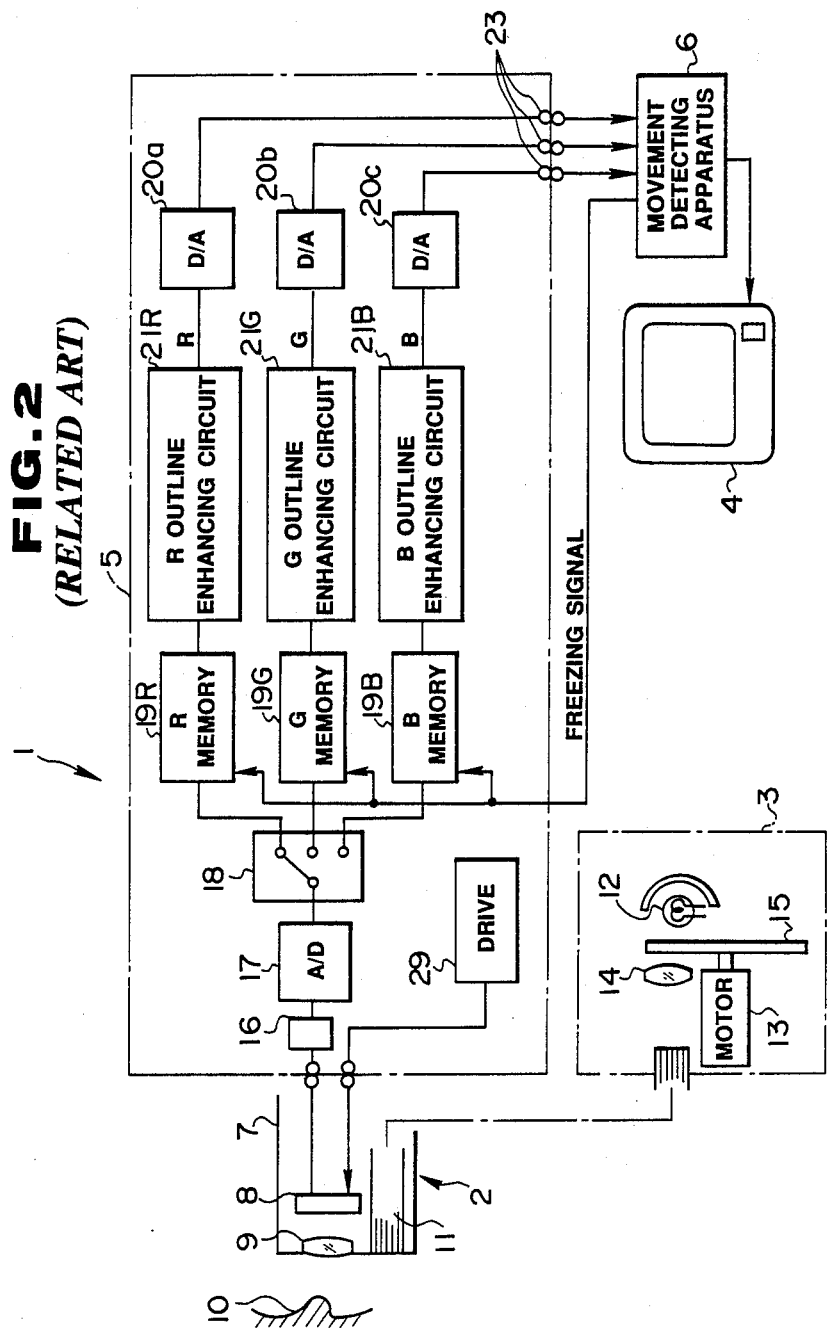
Figure 3:
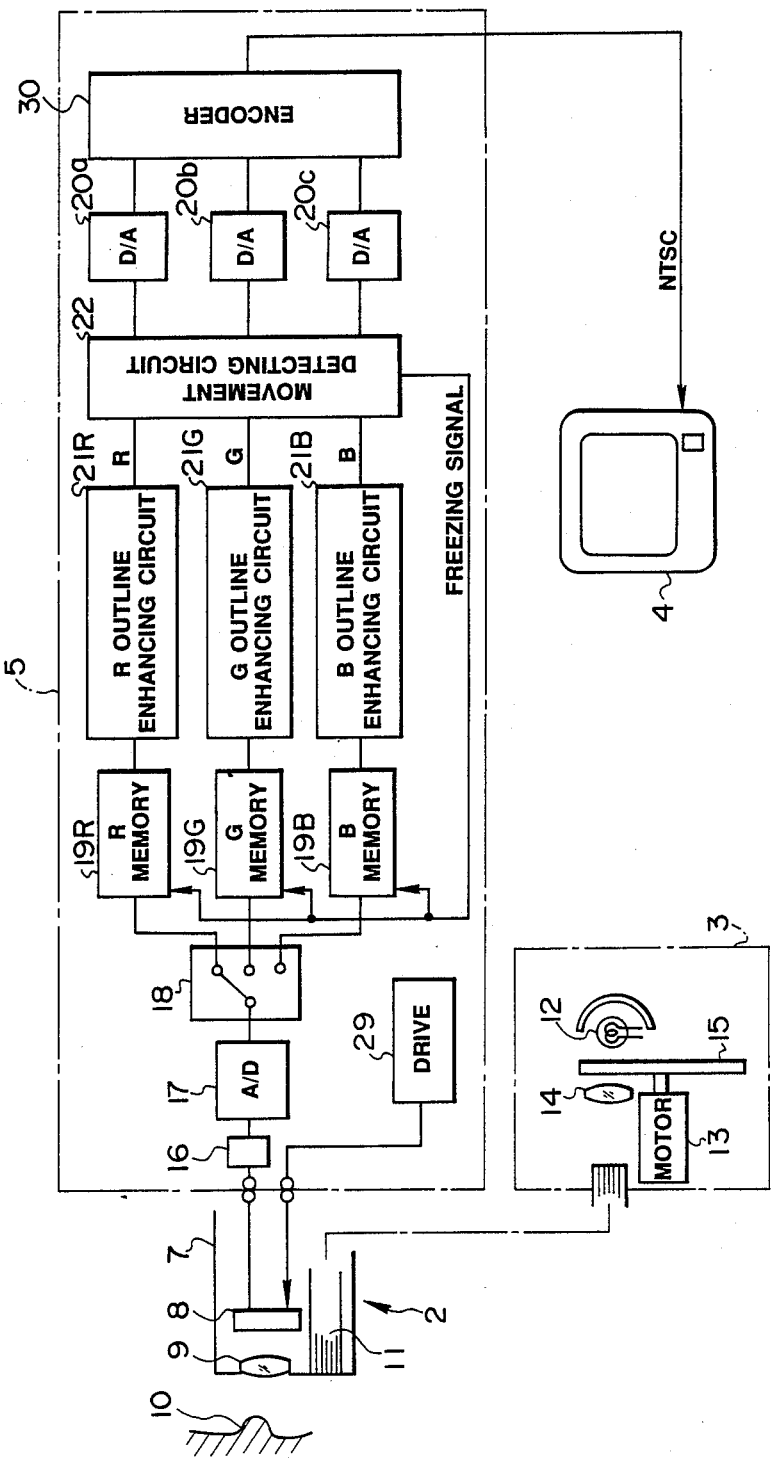

In this embodiment, the same formations as in FIGS. 2 and 3 shall bear the same reference numerals and shall not be explained.

An illuminating light emitted from a light source apparatus 3 is radiated to an object 10 by a light guide 11. The illuminated object 10 forms an image on the imaging surface of a solid state imaging device 8 by an objective lens system 9. The formed image is photoelectrically converted and is input into a multiplexer 18 through an A/D converter 17. The multiplexer 18 writes chrominance signals into an R memory 19R, G memory 19G and B memory 19B. The written chrominance signals are simultaneously read out and are input into a movement detecting circuit 22. The chrominance signals input into the movement detecting circuit 22 are delivered to an outline enhancing circuit 21, have the outlines enhanced in the outline enhancing circuit 21 and are input into an encoder 30 through D/A converters 20. The chrominance signals are converted to a video signal in the encoder 30 and the object image is displayed in a monitor 4.

Figure 1:
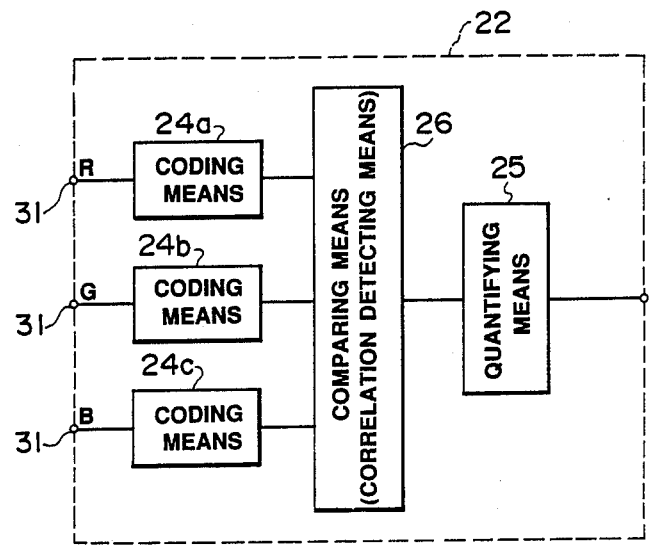

Here, when a freezing signal is input from a switch (not illustrated) provided on a front panel of a controlling apparatus 5 or in an electronic endoscope 2, the movement detecting circuit 22 will operate. As in FIG. 1, the movement detecting circuit 22 comprises coding means 24a, 24b and 24c, a comparing means 26 and a quantifying means 25 and chrominance signals R, G and B are input respectively into the coding means 24a, 24b and 24c through respective terminals 31. The coding means 24a, 24b and 24c respectively n-value the pixel difference signals of the input signals and code and output the n-valued signals. The respective n-valued output signals are conceptionally considered to be differential outputs of the input signals as approximated by n kinds of direction vectors. Therefore, if the respective input signals R, G and B are correlated, the direction vectors of the respective signals will coincide or will be similar but, if the input signals are not correlated, the direction vectors will not coincide or will not be similar. Therefore, when the respective signals are compared with the above mentioned coded output signals by the comparing means and are further quantified by the quantifying means 25, the sizes of the movement quantities will be able to be detected. By these detected movement quantities, if the relative color movement quantities of R, G and B are smaller than in the present images, the movement detecting circuit 22 will make a newly freezing operation for the R, G and B memories 19 R, 19 G and 19B. Thus, R, G and B images having no color movement will be finally formed.

Figure 5A:
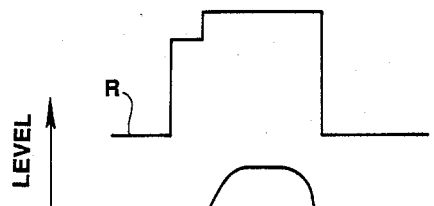
FIGS. 5a–5c show waveform diagrams of signals R, G and B.
Figure 5B:
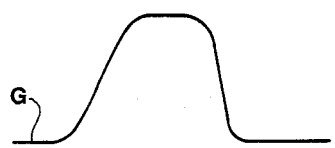
Figure 5C:
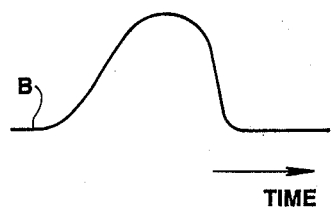
Figure 9:
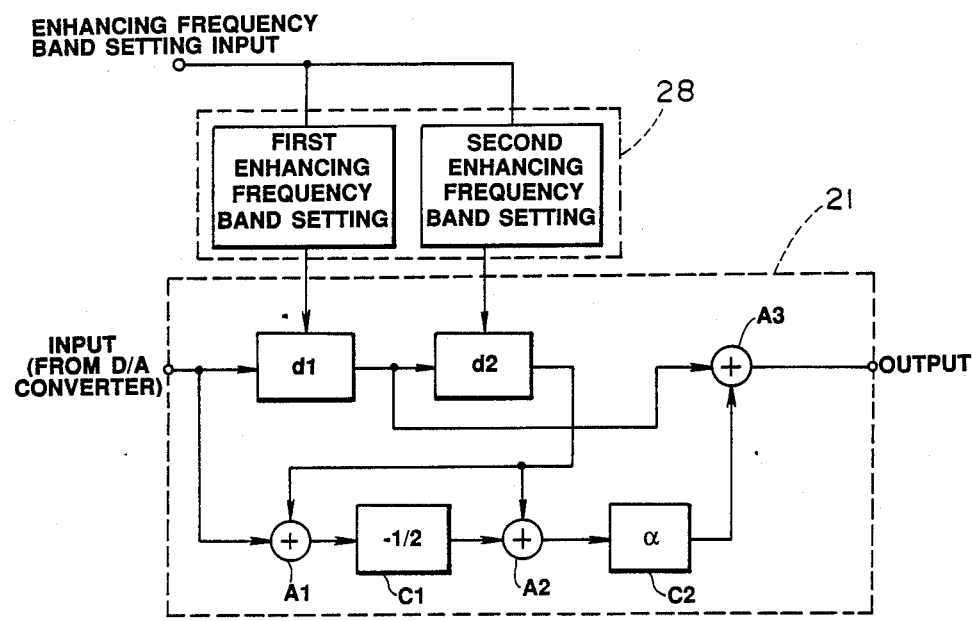
Figure 11:
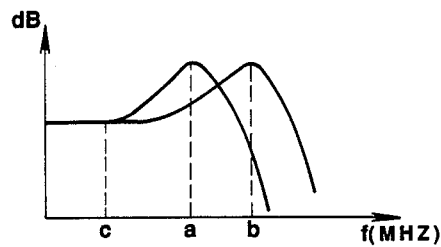
Figures 12A, 12B, 12C, 12D, 13A, 13B, 13C, 13D:
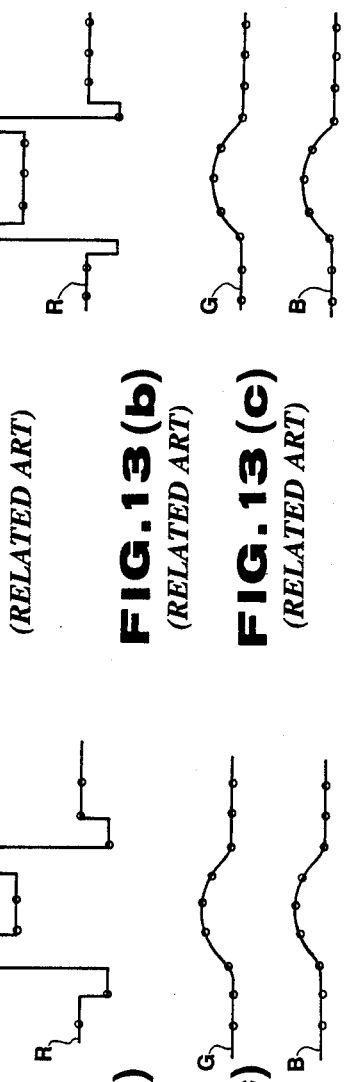
FIGS. 12a–12d show operations explaining diagrams of a comparing means of an enhancing frequency of a $MH_z$.
FIGS. 13a–13d show operations explaining diagrams of a comparing means of an enhancing frequency of b $MH_z$.
Figure 15:
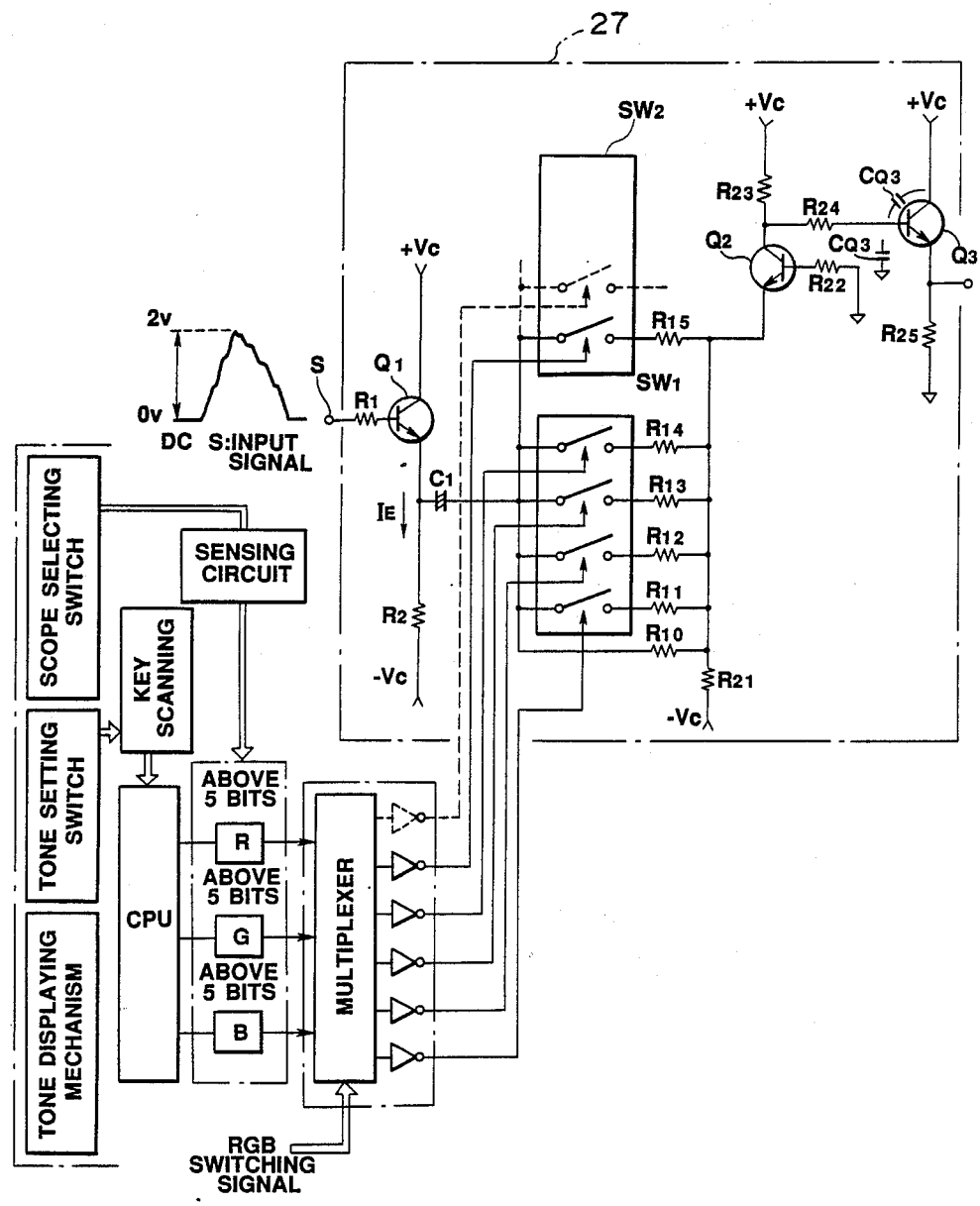

If the R, G and B outline enhancing circuits 21 are arranged in the step after the movement detecting circuit 22, the movement detections shown in FIG. 6 will be made on the input images of such R, G and B movement detections as, for example, in FIG. 5 and the color movement will be judged to be none. In this case, as no image having less color movement than in these images can exist, the freezing will not be renewed. The outlines of these R, G and B images are enhanced to obtain R', G' and B' image signals shown in FIG. 7. These R', G' and B' video signals are converted by the encoder 30 to a video signal which is input into the monitor 4. Therefore, only the images having no color movement are input into the outline enhancing circuit 21. Therefore, such images R", G' and B' obtained by enhancing the outlines of the images having color movements as are shown in FIG. 8 can not be input into the encoder 30.

That is to say, as the outline enhancing circuit 21 is provided after the movement detecting circuit 22, the color movement sensing precision of the movement detecting circuit will be improved and a favorable image having no color movement and enhanced in the outline will be obtained.

Figure 4:
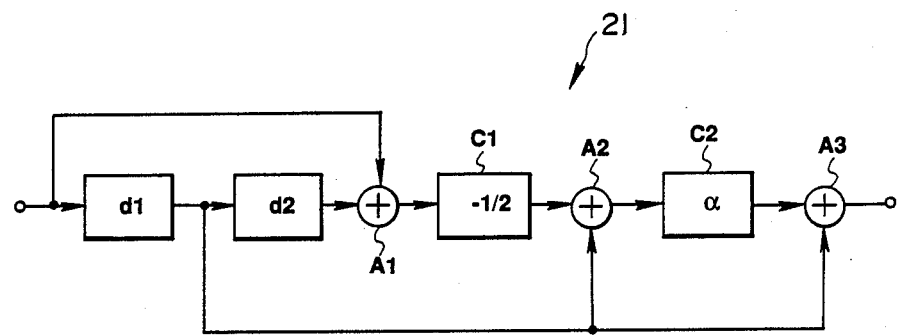
Figure 19A:
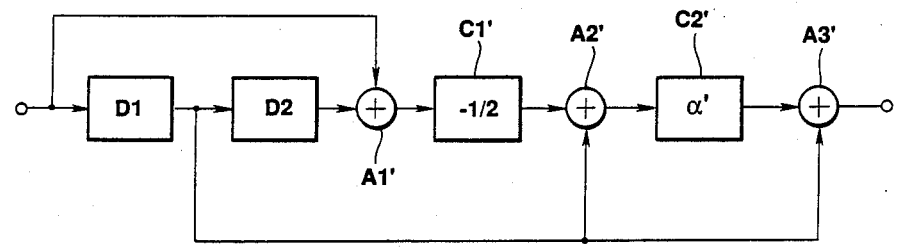
FIGS. 19a–19c show block diagrams of outline enhancing circuits.
Figure 19B:
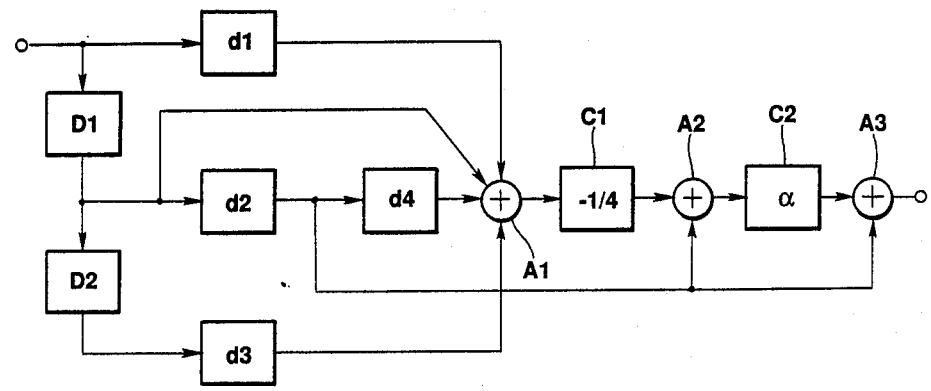
Figure 19C:
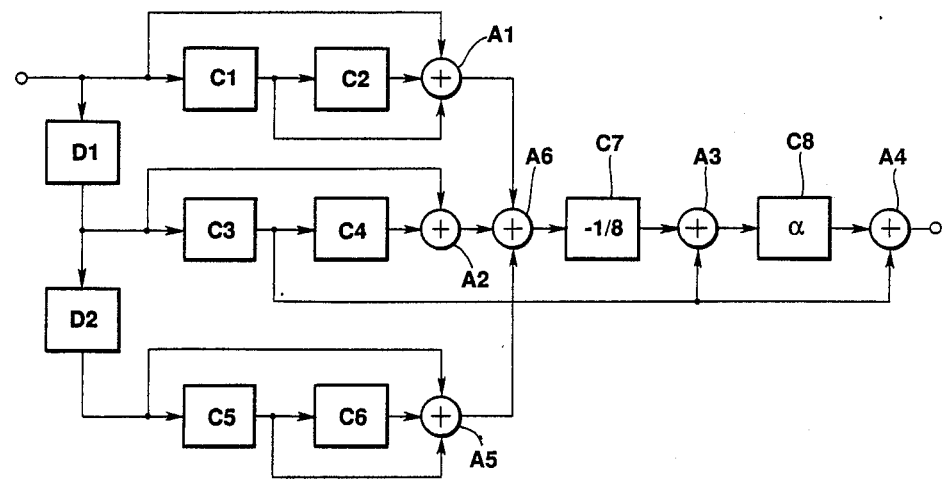

Here, the outline enhancing circuit 21 may be not only of the horizontal outline enhancement shown in FIG. 4 but also of the vertical outline enhancement shown in FIG. 19(a), the horizontal-vertical or vertical-horizontal outline enhancement made by forming FIGS. 4 and 19(a) in series, such horizontal and vertical parallel formation as in FIG. 19(b) and such multi-outline enhancements by the horizontal, vertical and oblique directions as in FIG. 19(c) and any other outline enhancing circuit.

In FIG. 19(a), a delaying device D making a delay of 1 H is used instead of the the delaying device d in FIG. 4 but the others are the same.

In FIG. 19(b), the input signal is input into an adder A1 through a delaying device d1 and is input into a delaying device D1 having a delay amount of 1H. The signal passed through this delaying device D1 is input into an adder A1 and is also input into delaying devices d2 and D2. The signal passed through the delaying device D2 of a delay amount of 1H is input into the adder A1 through a delaying device d3. The signal passed through the delaying device d2 is input into adders A2 and A3 and is input into the adder A1 through a delaying device d4. The signal added in this adder A1 is passed through a counter C1 making $-\frac{1}{4}$ time, is then input into the adder A2, is added to the signal passed through the delaying device d2 and is added in an adder A3 through a counter C2 making $\alpha$ times to output a signal enhanced in the horizontal and vertical outlines.

In FIG. 19(c), the input signal is input into the adder A1 and is also input into the adder A1 through a delaying device C1 giving a delay amount of 1 pixel part. Also, the signal passed through this delaying device C1 is further passed through a delaying device C2, is input into the adder A1 and is added in this adder A1. Also, the above mentioned input signal is passed through a delaying device D1 giving a delay amount of 1H, is then input into an adder A2 and is input into a delaying device D2 and C3. The signal passed through the delaying device C3 is input into adders A3 and A4 and is added in the adder A2 through a delaying device C4. The signal passed through the above mentioned delaying device D2 is input into an adder A5 and is added in the adder A5 after being passed through a delaying device C5, in a part, directly but, in the other part, through a delaying device C6. The signals added respectively in these adders A1, A2 and A3 are added in an adder A6 in the next step, are then passed through a counter C7 making $-\frac{1}{8}$ time, are then added in the adder A3, are passed through a counter C8 making times and are further added in the adder A4 to outut a signal enhanced in the outline in the multi-directions.

FIGS. 20 to 24 show the second embodiment of the present invention.

In this embodiment, the present invention is applied to an endoscope apparatus which is of a simultaneous imaging system.

Figure 20:
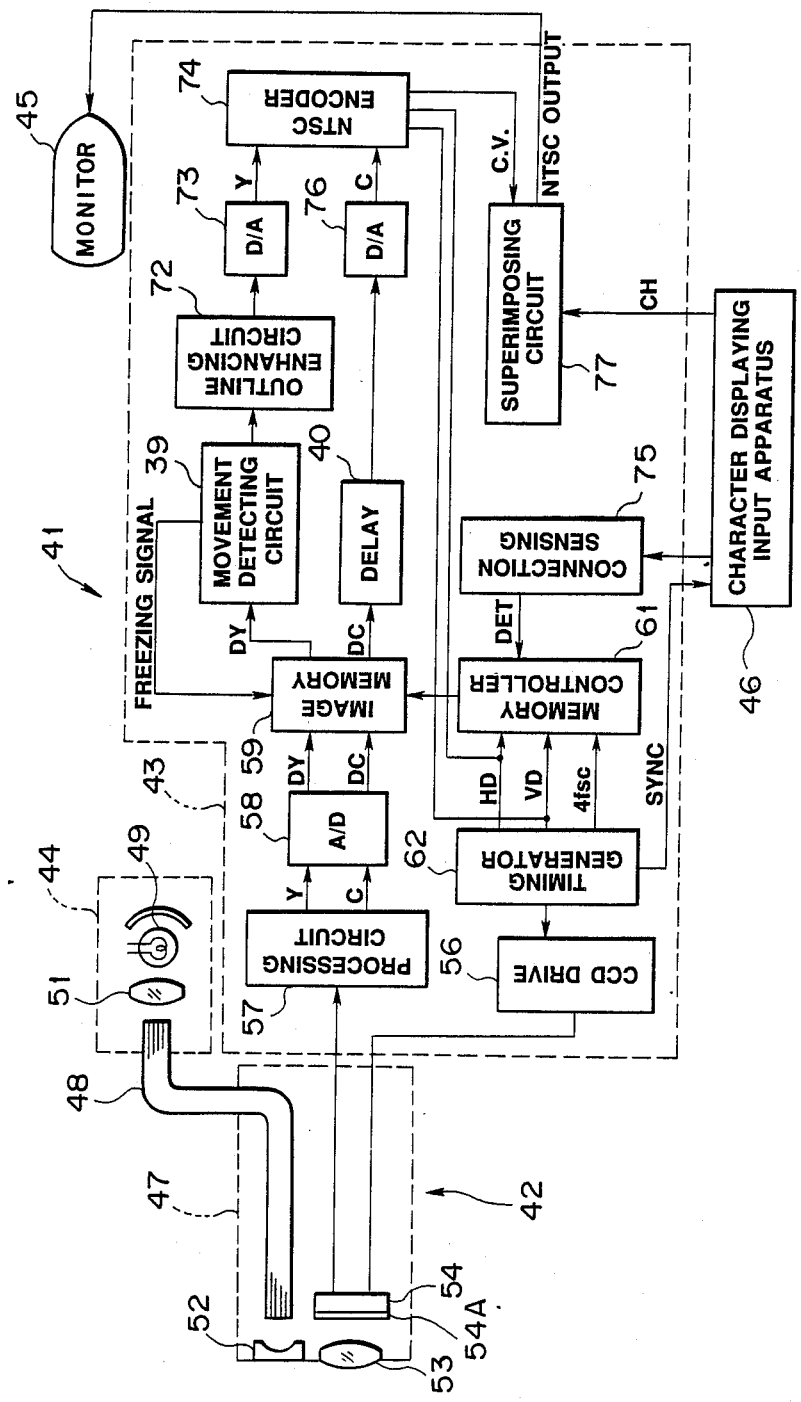

As shown in FIG. 20, an endoscope apparatus 41 comprises an electronic scope 42, a camera controlling unit 43 connected with this electronic scope 42 and processing signals, a light source apparatus 44 feeding an illuminating light to the above mentioned electronic scope 42, a TV monitor 45 displaying an image signal output from the above mentioned camera controlling unit (which shall be abbreviated as CCU hereinafter) 43 and a character displaying input apparatus 46 externally fitted to the above mentioned CCU 43.

In the above mentioned electronic scope 42, a light guide 48 transmitting the illuminating light is inserted through an elongate insertable part 47 so that, when this light guide 48 is connected at the entrance end to the light source apparatus 44, a white color light of a light source lamp 49 will be condensed and radiated by a condenser lens 51. The illuminating light is transmitted to the exit end surface on the tip side of the insertable part 47 by this light guide 48 and is emitted on the object side through a light distributing lens 52. An optical image of the object illuminated by this illuminating light is formed by an objective lens 53 on a solid state imaging device (which shall be abbreviated as a CCD hereinafter) 54 arranged in the focal plane of this objective lens 53. A mosaic filter 54A, for example, of R, G and B is arranged on the light receiving surface of this CCD 54.

When a driving signal from a CCD driving circuit 56 within the CCU 43 is applied to the above mentioned CCD 54, a photoelectrically converted image signal (video signal) will be output. This image signal is input into a processing circuit 57 within the CCU 43 and is processed to be converted to a luminance signal Y and chrominance signal C (representing, for example, two color difference signals R-Y and B-Y). These luminance signal Y and chrominance signal C are converted to a luminance signal DY and chrominance signal DC of digital amounts and are input into an image memory 59 which is controlled in writing in and reading out by a memory controller 61. This memory controller 61 takes in from a timing generator 62 a horizontal synchronizing signal HD, vertical synchronizing signal VD and clock signal 4 fsc to be used in the A/D conversion and D/A conversion and controls the above mentioned image memory 59. The CCD driving circuit 56 also takes in a timing signal prescribing the timing of reading out of the timing generator 62 and outputs a driving signal as synchronized with this signal. The digital luminance signal DY read out of the above mentioned image memory 59 is input into a movement detecting circuit 39 and the digital chrominance signal DC is input into a delay circuit 40.

In case the movement detecting circuit 39 is not operating, the digital luminance signal DY will be enhanced in the outline by an outline enhancing circuit 72, will be analogized by a D/A converter 73 and will be input into an NTSC encoder 74. On the other hand, the digital chrominance signal DC delayed in the delaying circuit 40 by the delay time from the image memory 59 of the luminance signal Y to the D/A converter 73 is converted to an analog signal in the D/A converter 76 and is input into the NTSC encoder 74 in the same manner. The luminance signal and chrominance signal are made a composite video signal C.V. of an NTSC system in the NTSC encoder 74 and are input into a superimposing circuit 77. This superimposing circuit 77 superimposes the above mentioned composite video signal C.V. and a character information CH delivered from a character displaying input apparatus 46 on each other and outputs the superimposed composite video signal to the monitor 45 to display the video image together with the characters.

The above mentioned character displaying input apparatus 46 has an external synchronizing input terminal so that, when a synchronizing signal SYNC from the timing generator 62 within the CCU 43 is applied, a character information CH will be output as synchronized with this synchronizing signal SYNC.

Also, the above mentioned CCU 43 has a connection sensing circuit 75 within it so that, when the character displaying input apparatus 46 is connected, a connection sensing signal DET will be delivered to the memory controller 61 and, when the memory controller 61 receives this connection sensing signal DET, the timing of reading out of the image memory 59 will be moved and a displaying position switching operation will be made to move the endoscope image displayed in the monitor 45 sidewise from the center of the monitor displaying picture.

Figure 21:
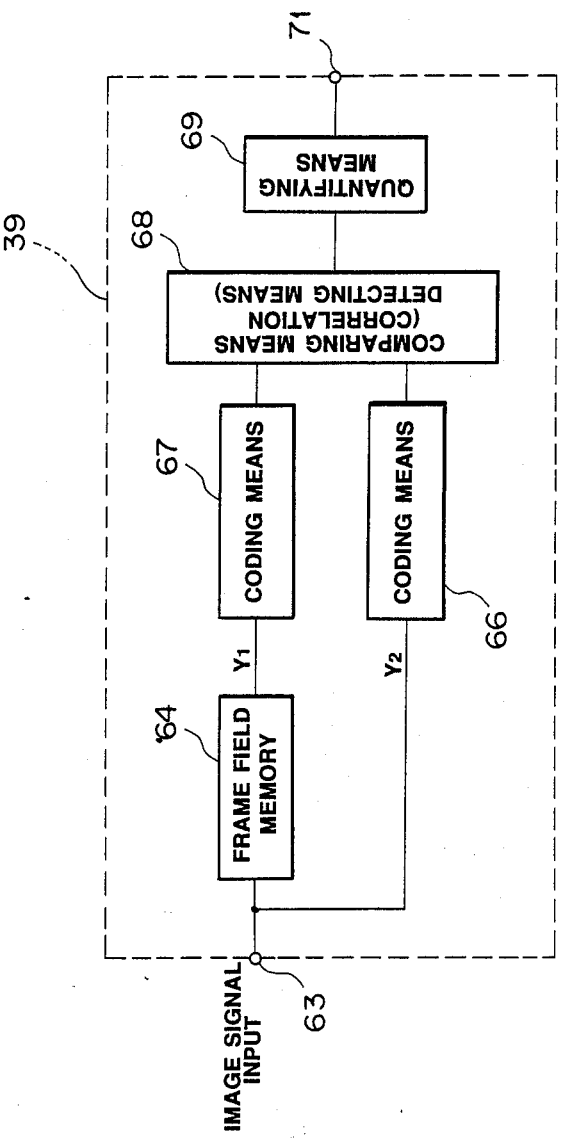

The above mentioned movement detecting circuit 39 is of a formation as is shown in FIG. 21.

In FIG. 21, when a freezing signal is input by a switch (not illustrated), the movement detecting circuit 39 will be in an operating state. When in the operating state, image signals Y1 and Y2 imaged at different times will be sequentially input into a frame (or field) memory 64 through an input end 63 and also into a coding means 66. The image signal Y1 input at first into the frame (or field) memory 64 and delayed by one frame (or field) period will be input into a coding means 67 at the same time when the next input image signal Y2 is input into a coding means 66. These coding means 66 and 67 n-value, code and output the difference signals of sample values in each predetermined sampling period of the respective input signals. The coded signal output is compared by a comparing means 68, is then input into a quantifying means 69, is quantified and is output from an output end 71. If the relative image movement quantity between the image signal Y1 delayed by one frame (or field) period and the next input image signal Y2 is small, the movement detecting circuit 39 will make a newly freezing operation on the image memory 59 depending on the size of the quantified movement quantity. Thus, an image having no image movement is finally formed.

Figure 22:
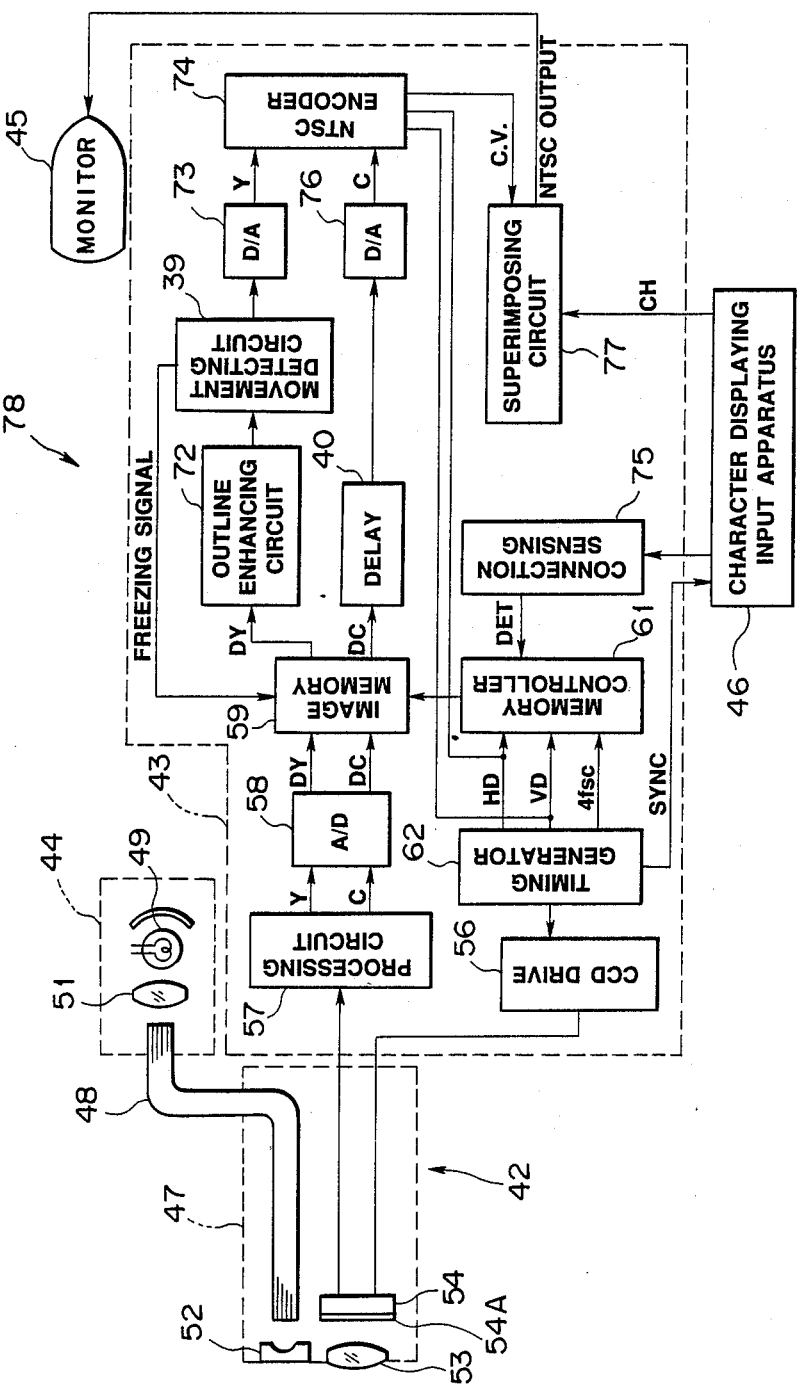

Here, an endoscope apparatus 78 wherein an outline enhancing circuit 72 shown in FIG. 22 is provided before the movement detecting circuit 39 shall be described to compare it with the endoscope apparatus 41 of this embodiment.

FIG. 23 shows the state in the case that there is no image movement and a random noise is mixed in before the outline enhancing circuit 72. FIG. 24 shows the state in the case that there is an image movement but there is no random noise.

In FIG. 23, in the endoscope apparatus 78, as the outline enhancement is applied to the luminance signal Y in which a random noise is mixed, the random noise will be in the conspicuous form as in the luminance signal Y2. Therefore, when input into this signal movement detecting circuit 39, the number of FLAG's will be six. Also, in FIG. 24, in the luminance signal in the state that there is an image movement, the number of FLAG's will be two. It is determined that the sensed image movement quantity is smaller in the image having an image movement than in the image having no image movement. The image having an image movement will be frozen and a flicker will be produced. Thus, in case the movement detecting circuit 39 is located in the step after the outline enhancing circuit 72, no favorable image will be obtained. Therefore, when the outline is enhanced after the movement detecting circuit 39 as in this embodiment, even if a random noise mixes in, the noise will not be in the conspicuous form, the FLAG will not substantially stand in the image having no image movement and a favorable frozen image will be obtained.

FIG. 25 shows the third embodiment of the present invention.

In this embodiment, a switching switch is provided instead of the movement detecting circuit in the second embodiment so that, by this switching switch, a movement detecting apparatus 84 provided outside the CCU 43 may be electrically connected.

A digital luminance signal DY of an image memory 59 provided within a CCU 43 forming an endoscope apparatus 80 is input into a switch part 81 provided with a switch 82 of one input and two outputs and a switch 83 of two inputs and one output. The input terminal 82a of the switch 82 of one input and two outputs is connected with the above mentioned image memory 59. On the other hand, the output terminal 82b is connected to a movement detecting apparatus 84. The other output terminal 82c is conneacated to one input terminal 83a of the switch 83 of two inputs and one output. The other input terminal 83b of the switch 83 of two inputs and one output is connected to the movement detecting apparatus 84. The output terminal 83c is connected to an outline enhancing circuit 38.

The movement detecting circuit 39 in FIG. 21 described in the first embodiment is provided within the movement detecting apparatus 84.

In the above mentioned switch part 81, when no freezing signal is input from a freezing switch (not illustrated), the terminals 82a and 82c and the terminals 83a and 83c will be closed and the digital luminance signal DY output from the image memory 59 will be output to an outline enhancing circuit 72. When a freezing signal is input, the terminals 82a and 82b and the terminals 83b and 83c will be closed and the digital luminance signal DY will be output to a movement detecting apparatus 84. In the following, the formations and operations of the movement detecting apparatus 84 are as described in the second embodiment.

The other formations are the same as in the third embodiment.

When formed as in this embodiment, in case no image movement is detected, the freezing signal will be delivered to the image memory 59 and the image will be frozen. As the outline of the luminance signal having no image movement is enhanced, a favorable image will be obtained.

The other effects are the same as in the first embodiment.

Figure 26:
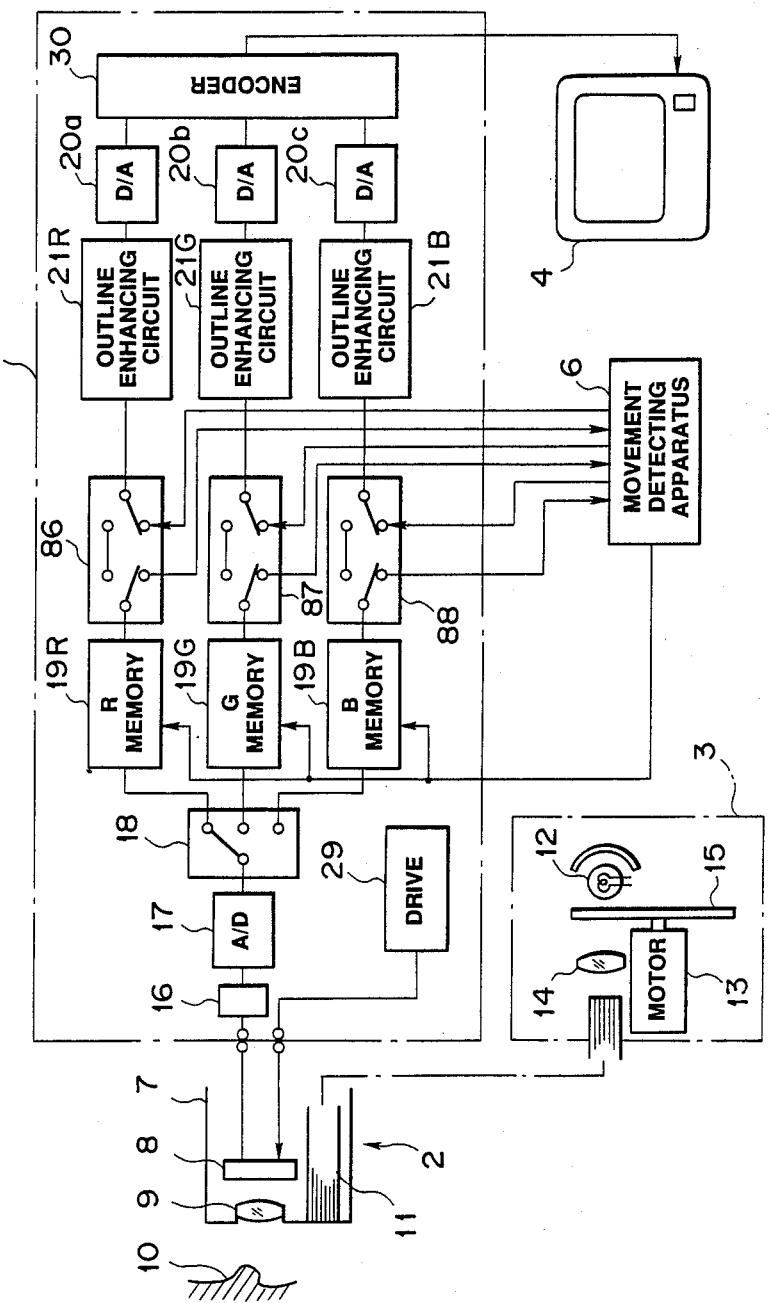
FIG. 26 relates to the fourth embodiment of the present invention and is an explanatory diagram of the formation of an endoscope apparatus.

FIG. 26 shows the fourth embodiment of the pesent invention.

In this embodiment, a switching switch part is provided instead of the movement detecting circuit in the first embodiment so as to be electrically connected with a movement detecting apparatus 6 provided outside a controlling apparatus 5.

Respective chrominance signals R, G and B read out of R, G and B memories 19R, 19G and 19B of a controlling apparatus 5 forming an endoscope apparatus 85 are input into respective switch parts 86, 87 and 88 which are of the same formations as of the switch part 81 described in the third embodiment, can output the respective chrominance signals R, G and B to the detecting apparatus 6 and are connected respectively to outline enhancing circuits 21R, 21G and 21B.

The other formations are the same as in the first embodiment.

The respective switch parts 86, 87 and 88 will input R, G and B signals respectively into the outline enhancing circuits 21 from the respective memories 19 when no freezing signal is input from a freezing switch (not illustrated) but will be switched to output the R, G and B signals to the movement detecting apparatus 6 as in FIG. 26 when a freezing signal is input.

In this embodiment, as the switch parts 86, 87 and 88 are provided respectively between the memories 19R, 19G and 19B and the outline enhancing circuits 21R, 21G and 21B, the output signals from the memories 19R, 19G and 19B will be output to the external movement detecting apparatus 6. In case no color movement is sensed, a freezing signal will be delivered to the memories 19R, 19G and 19B. As the outlines of the R, G and B signals having no color movement are enhanced, a favorable image will be obtained.

The present invention may be applied not only to an electronic endoscope but also to an externally fitted television camera fitted to an optical endoscope having an image guide.

As explained above, according to the present invention, as the outline enhancing circuits are provided after the movement detecting circuit, the precision of sensing the color movement and image movement of the movement detecting circuit will be improved and a favorable image having no color movement even if the outline enhancement is applied or the outline enhancing frequency is varied will be obtained

What is claimed is:

1. A signal processing apparatus comprising:
    a video signal producing means for producing a standard video signal by processing an image signal representing an image of an object to be imaged;
    a movement detecting circuit for detecting a movement quantity which quantatively represents movement of said object from said video signal;
    an external output terminal for receiving said video signal and for outputting said video signal outside of said signal processing apparatus; and
    an outline enhancing means, provided between said movement detecting circuit and said external output terminal, for enhancing an outline of the image.

2. A signal processing apparatus according to claim 1 wherein said movement detecting circuit comprises a plurality of difference signal producing means for producing difference signals representing a change of a level of respective plural image signals representing images of the object imaged at different times, a correlation detecting means for detecting correlation of said plural difference signals and a quantifying means for quantifying a signal output detected by said correlation detecting means.

3. A signal processing apparatus according to claim 2 wherein said movement detecting circuit further has a delaying means for delaying the image signal by one field or one frame.

4. A signal processing apparatus according to claim 1 wherein said outline enhancing means is formed of a horizontal direction outline enhancing circuit for enhancing the outline in a horizontal direction.

5. A signal processing apparatus according to claim 1 wherein said outline enhancing means is formed of a vertical direction outline enhancing circuit for enhancing the outline in a vertical direction.

6. A signal processing apparatus according to claim 1 wherein said outline enhancing means is a horizontal and vertical outline enhancing circuit for enhancing the outlines in a horizontal and vertical directions.

7. A signal processing apparatus according to claim 6 wherein said outline enhancing means is further a multi-outline enhancing circuit for enhancing the outline in an oblique direction.

8. A signal processing apparatus according to claim 1 further having between the movement detecting circuit and said video signal producing means, a switching means for selectively inputting said image signal into aid outline enhancing means.

9. An electronic endoscope apparatus comprising:
an electronic endoscope provided with an elongate insertable part, an objective optical system provided on a tip part side of said insertable part and forming an image of an object, an image device photoelectrically converting the image based on said objective optical system and an illuminating light emitting means for emitting an illuminating light from the tip part side of said insertable part;
a driving signal outputting means for outputting a driving signal to output an image signal from said imaging device;
a video signal processing means having an image storing means for temporarily storing said image signal as a still picture and producing a standard video signal from said image signal;
a displaying means for displaying said standard video signal on a monitor;
a movement detecting circuit formed of a plurality of difference signal producing means for producing difference signals representing a change of a level of respective plural image signals representing images of the object imaged at different times by said imaging means, a correlation detecting means for detecting the correlation of a plurality of difference signals and a quantifying means for quantifying the signal output detected by said correlation detecting means; and
an outline enhancing means, provided between said movement detecting circuit and said displaying means, for enhancing an outline of the image.

10. An electronic endoscope apparatus according to claim 9 wherein said movement detecting circuit further has a delaying means for delaying the image signal by one field or one frame.

11. An electronic endoscope apparatus according to claim 9 wherein said light emitting means sequentially emits lights in wavelength regions different from each other.

12. An electronic endoscope apparatus according to claim 9 wherein said imaging device has color separating filters arranged on a front surface.

13. An electronic endoscope apparatus according to claim 12 wherein said light emitting means emits a white color light.

14. A signal processing apparatus according to claim 9 wherein said outline enhancing means is formed of a horizontal direction outline enhancing circuit for enhancing the outline in a horizontal direction.

15. A signal processing apparatus according to claim 9 wherein said outline enhancing means is formed of a vertical outline enhancing circuit for enhancing the outline in a vertical direction.

16. A signal processing apparatus according to claim 9 wherein said outline enhancing means is a horizontal and vertical outline enhancing circuit for enhancing the outlines in horizontal and vertical directions.

17. A signal processing apparatus according to claim 9 wherein said outline enhancing means is further a multi-outline enhancing circuit for enhancing the outline in an oblique direction.

18. A signal processing apparatus according to claim 9 further having between the movement detecting circuit and the video signal processing means, a switching means for selectively said image signal into said outline enhancing means.

* * * * *